US012590791B2

(12) United States Patent
Lininger

(10) Patent No.: US 12,590,791 B2
(45) Date of Patent: Mar. 31, 2026

(54) APPARATUS FOR MEASURING SHEET-LIKE WORKPIECES, IN PARTICULAR FLAT GLASS PANES OR INSULATING GLASS ELEMENTS

(71) Applicant: LISEC Austria GmbH, Seitenstetten (AT)

(72) Inventor: Markus Lininger, Seitenstetten (AT)

(73) Assignee: LISEC Austria GmbH, Seitenstetten (AT)

( * ) Notice: Subject to any disclaimer, the term of this patent is extended or adjusted under 35 U.S.C. 154(b) by 396 days.

(21) Appl. No.: 18/492,316

(22) Filed: Oct. 23, 2023

(65) Prior Publication Data

US 2024/0102785 A1 Mar. 28, 2024

Related U.S. Application Data

(63) Continuation of application No. PCT/EP2022/060627, filed on Apr. 21, 2022.

(30) Foreign Application Priority Data

Apr. 22, 2021 (DE) .................... 10 2021 110 360.6

(51) Int. Cl.
G01B 5/04 (2006.01)
(52) U.S. Cl.
CPC .................................... G01B 5/043 (2013.01)
(58) Field of Classification Search
CPC .................................................... G01B 5/043
See application file for complete search history.

(56) References Cited

U.S. PATENT DOCUMENTS 2,910,908 A 11/1959 Meyer, Jr.
5,214,490 A * 5/1993 Abe et al. .............. G01B 11/92
356/383

FOREIGN PATENT DOCUMENTS

KR 20120031872 A 4/2012
WO 2017/161390 A1 9/2017

OTHER PUBLICATIONS

International Search Report with English translation in International Application No. PCT/EP2022/060627, mailed Aug. 17, 2022, 4 pages.

* cited by examiner

*Primary Examiner* — John E Breene
(74) *Attorney, Agent, or Firm* — Edell, Shapiro & Finnan, LLC

(57) ABSTRACT

An apparatus for measuring a plate-shaped workpiece comprises a conveying device for conveying the plate-shaped workpiece in a conveying direction along a conveying path and first and second measuring devices including respective first and second drivers and respective first and second measuring rulers. Each of the first and second drivers is selectively couplable to and decouplable from a main surface of the plate-shaped workpiece. In a coupled state, the drivers are moveable together with the plate-shaped workpiece in the conveying direction and, in a decoupled state, are actively movable in a direction opposite to the conveying direction. The measuring rulers extend in the conveying direction such that the positions and/or movement distances of the drivers in the conveying direction are detectable. The first and second measuring rulers detect different regions of the conveying path of the plate-shaped workpiece in the conveying direction.

17 Claims, 6 Drawing Sheets

APPARATUS FOR MEASURING SHEET-LIKE WORKPIECES, IN PARTICULAR FLAT GLASS PANES OR INSULATING GLASS ELEMENTS

TECHNICAL FIELD

The invention relates to an apparatus for measuring plate-shaped or panel-shaped workpieces, in particular, flat glass sheets or insulating glass elements.

BACKGROUND

Such an apparatus can be integrated as an independent component in a conveying apparatus of a production plant or can be combined with a processing apparatus, for example, a sealing apparatus, a grinding apparatus or a cutting apparatus or an apparatus for applying a spacer in the production of insulating glass elements.

In production processes of plate-shaped or panel-shaped workpieces, in particular, flat glass sheets or insulating glass elements, it is customary to measure the dimensions, i.e., the geometry of the outer contour, in order to use them for documentation purposes or for controlling the conveying or processing procedures. In this case the plate-shaped or panel-shaped workpieces can be designed to be rectangular or square or as special shapes. FIG. 5 shows examples of special shapes of flat glass sheets or insulating glass elements that can be measured with the measuring apparatus.

The dimensions are usually determined as coordinates of prominent edge points of the outer contour in a rectangular coordinate system, in which an X axis or coordinate is the length of the workpiece parallel to a conveying direction; a Z axis or coordinate is the thickness of the workpiece normal or transverse to the conveying direction; and a Y axis or coordinate is the height of the workpiece normal to the X axis and the Z axis. In this case the measurement of the height (Y axis) and the thickness (Z axis) does not generally present a problem, even in the case of large plate-shaped workpieces, because the thickness and the height are variables that are defined by the working width or the height of the apparatus or processing system. In contrast, the measurement of the length (X axis) is difficult, if the maximum dimension of the workpiece exceeds the length of the apparatus. In these cases the length is generally measured continuously in the direction of the X axis during a transport or conveying operation of the workpiece.

DE 196 41 861 A1 discloses such an apparatus for determining the shape of panel-shaped objects, in particular, insulating glass sheets. Said apparatus comprises a support device, against which the panel-shaped object abuts; optical sensors; a conveying device, in order to move the panel-shaped object and the optical sensors relative to each other; and a device for determining the conveying path as an X coordinate of the panel-shaped object in the form of a position encoder of the drive of the conveying device. There are a plurality of optical sensors that are arranged in at least one row that is oriented parallel to the plane of the panel-shaped object as well as at an angle to the conveying direction, in order to determine a Y coordinate of the panel-shaped object. By assigning the X and Y coordinates to one another, the entire outer contour can be determined.

One drawback with measuring the length or X coordinate of the workpiece in the conveying direction by means of a position encoder of the drive of the conveying device is that a slip between the conveying device and the workpiece, which occurs during braking and acceleration of the conveying device, in particular, when the workpiece rests on conveyor rollers or conveyor belts and is held only by the friction resulting from the gravitational force, will inevitably lead to a measurement error in the course of determining the size or the position and the coordinates of the workpiece or of prominent points on the workpiece, at which certain processes are to be carried out.

EP 3 433 576 B1 discloses an inspection system for optically checking a flat glass sheet, in which the flat glass sheet rests with a lower end face on a conveyor belt and is moved by said conveyor belt with a plane or main surface of the flat glass sheet, which is inclined slightly to the side (in transverse direction) horizontally past a stationary optical inspection unit that detects irregularities (dirt, bores, scratches, edges) on the flat glass sheet. In order to clearly assign the positions of these irregularities, even in the direction parallel to the conveying direction, the respective position of the flat glass sheet in the direction parallel to the conveying direction of the conveyor belt is measured continuously with a measuring apparatus that has a fixed longitudinal scale and a slide gauge, which is moved together with the flat glass sheet and the position of which relative to the longitudinal scale can be detected by means of sensors.

The slide gauge is held displaceably on a support profile. Said slide gauge has a stop member that can be pivoted relative to the slide gauge about an axis that lies parallel to the plane of the flat glass sheet, so that said stop member can be pivoted with its stop face with the flat glass sheet into or out of the plane of the flat glass sheet. The slide gauge is displaced along the longitudinal scale by the flat glass sheet, against the front end face of which in the direction of movement the stop member abuts in the pivoted-in state. When the slide gauge arrives at a signal transmitter or if it has been detected that the flat glass sheet has completely passed through the inspection unit, then the stop member is pivoted out of the plane of the flat glass sheet, so that the slide gauge is no longer moved together with the flat glass sheet.

The slide gauge is moved by means of a conveyor belt back into its starting position opposite to the conveying direction of the conveyor belt. In said starting position the slide gauge waits with its stop member in the pivoted-in state for the arrival of the next flat glass sheet until its front end face in the direction of movement of the conveyor belt strikes against the stop member. As a result, the displacement of the slide gauge, which is synchronous with the movement of the next flat glass sheet, along the longitudinal scale with said flat glass sheet is effected.

In the event that the front end face of the flat glass sheet in the direction of movement is not oriented normal to the direction of movement, but rather has regions that are at different distances from the front in the direction of movement, as, for example, in the case of the special shapes shown in FIG. 5, and/or if the flat glass sheet is very long in the direction of movement, then the inspection system, according to EP 3 433 576 B1, has two measuring apparatuses, each of which has a longitudinal scale and an associated slide gauge. For such special shapes the measuring apparatuses are arranged offset to one another in the direction of movement of the flat glass sheet and in the vertical direction; and the measuring ranges overlap.

The slide gauge, with which contact is first made at its stop member during the movement of the flat glass sheet, detects the movement and, thus, the coordinates of the flat glass sheet in the direction of movement, even before any region of the flat glass sheet reaches the optical inspection unit. After the flat glass sheet has been moved to such an extent that its front end face has also been brought into contact with the stop member of the slide gauge of the downstream longitudinal scale, this slide gauge assumes the detection of the movement coordinates of the flat glass sheet. The stop member of the previously active slide gauge is brought out of contact with the flat glass sheet; and the slide gauge is held by its own drive counter to the direction of movement of the flat glass sheet. As soon as the rear end face of the flat glass sheet in its direction of movement has passed through the slide gauge, said slide gauge can be moved by means of its own drive from the rear to the flat glass sheet in such a way that it abuts with its front stop member in the direction of movement against the rear end face of the flat glass sheet. In so doing, the rear slide gauge can now assume again the detection of the movement coordinates of the flat glass sheet. In this way the movement coordinates of the flat glass sheet can also be recorded without gaps, even if the flat glass sheet is so long that it already projects with its front surface region beyond that end of the measuring range of the longitudinal scale, arranged downstream of the optical inspection unit, that faces away from the optical inspection unit, before the flat glass sheet has completely passed through the optical inspection unit with its rear end face.

Whereas in the case of this apparatus the dimension or coordinate in the longitudinal direction can be determined by the slide gauge independently of slip influences of the drive, the maximum length of the workpieces, which can be measured, is limited, because one of the two slide gauges in the movement ranges of the apparatus must always bear against a front or rear end face of the workpiece in the conveying direction. In addition, the abutting of the slide gauge against the rear end face requires an active drive of the slide gauge during the measuring process, which must be synchronized with the conveying device of the workpiece, an aspect that is a relatively complex process.

SUMMARY

The object of the invention is to provide an apparatus for measuring plate-shaped or panel-shaped workpieces, in particular, flat glass sheets or insulating glass elements, with which very long workpieces, so-called oversized formats, can also be measured with high accuracy.

The invention relates, in particular, to an apparatus for measuring plate-shaped workpieces, in particular, flat glass sheets or insulating glass elements, comprising a conveying device for conveying the plate-shaped workpieces in a conveying direction along a transport path or conveying path, a first measuring device and a second measuring device, wherein each of the measuring devices has a driver that is designed in such a way that in the coupled state it can be selectively coupled to a plate-shaped workpiece and can be decoupled therefrom; that it can be moved together with said plate-shaped workpiece in the conveying direction; and that in the decoupled state it is actively movable in a direction opposite to the conveying direction, and that it is assigned to a preferably fixed/stationary measuring ruler, which extends in the conveying direction, in such a way that a position and/or a movement distance of the driver in the conveying direction can be detected, wherein the measuring rulers of the first and the second measuring device are arranged in such a way that they detect different regions of the conveying path of the plate-shaped workpiece in the conveying direction, and wherein the drivers of the first and the second measuring device are designed in such a way that they can be coupled to and decoupled from a main surface of the plate-shaped workpiece.

One advantage of the apparatus of the present invention for measuring plate-shaped workpieces is that in any case the measurement is the length or the coordinates in the longitudinal direction (X direction parallel to the conveying direction), even in the case of very long workpieces, the lengths of which significantly exceed the overall size of the apparatus itself, with a high degree of accuracy and without influences of slip. In principle, the invention enables an "endless" measurement of the length without interruption of the transport or conveyance by repeatedly repositioning the drivers of the two or, if necessary, more measuring devices on the main surface of the workpiece.

By attaching the drivers, in particular, in the form of suction devices, to the main surface of the workpiece, damage to and/or contamination of the end face are avoided on the front surfaces, which are the most sensitive due to the closely spaced corners of the cut edges. On the other hand, the main surfaces can also be easily cleaned at the end of a production process or can be protected continuously by protective films.

Preferably the drivers are designed to interact in a contactless or mechanical manner with the respectively associated measuring ruler, in order to detect the position and/or the movement distance of the respective driver in the conveying direction.

Preferably the drivers are each assigned to a transport device that is designed to guide the movement of the respective driver in the conveying direction and to actively move the respective driver in the direction opposite to the conveying direction by means of a drive.

Preferably the drivers are each mounted on a carriage that can be moved along a guide of the transport device.

The carriage is divided preferably into two sections that can move relative to one another in the conveying direction and wherein the driver is attached to one of the sections, which is also coupled to the measuring ruler, and the other section is coupled to the drive.

Preferably the two sections of the carriage are coupled to one another by means of a cylinder that can be switched between a first state, in which it rigidly connects the two sections to one another, and a second state, in which a damped relative movement between the two sections is made possible. The transport device has preferably a linear drive or a rotary drive, preferably a drag belt or a drag chain.

Preferably the drivers each have a suction gripper that can be coupled to and decoupled from the main surface of the plate-shaped workpiece.

Preferably the conveying device is designed in such a way that the plate-shaped workpiece can be conveyed on the conveying device in a vertical orientation or in an orientation inclined with respect to the vertical.

The conveying device comprises preferably a roller conveyor or a belt conveyor or a combination thereof.

The conveying device has preferably a conveying drive, in order to actively convey the plate-shaped workpiece in the conveying direction.

The apparatus has preferably an additional measuring device for detecting a dimension of the plate-shaped workpiece in a direction perpendicular to the conveying direction.

The apparatus for measuring plate-shaped workpieces has preferably a control unit that is designed to control the coupling and decoupling of the drivers of the first and the second measuring device in such a way that during the movement of the plate-shaped workpiece at least one of the drivers is always coupled to said workpiece. In addition, said control unit is designed to determine a cumulative movement distance of this workpiece in the conveying direction, on the basis of the detected positions and/or movement distances of the drivers of the first and second measuring device.

Preferably the control unit is designed to assign the detection result of the additional measuring device to the cumulative movement distance of the workpiece determined by means of the drivers of the first and second measuring device, in order to determine a contour and/or arbitrary regions of the workpiece.

BRIEF DESCRIPTION OF DRAWINGS

The invention is described below by means of a preferred embodiment, given as an example, with reference to the figures.

FIG. 3a shows a front view of an apparatus for measuring plate-shaped workpieces in one embodiment;

FIG. 3b shows a perspective front view of the apparatus from FIG. 3a;

FIG. 3c shows, in isolation, the detail of the measuring devices of the apparatus from FIGS. 3a and 3b, seen from behind;

DETAILED DESCRIPTION

The embodiments of an innovative apparatus 1, shown in schematic form in FIGS. 1a, 1b and 2, for measuring plate-shaped workpieces W (hereinafter simply referred to as the "measuring apparatus"), in particular, flat glass sheets or insulating glass elements, comprise a conveying device 2 for conveying the plate-shaped workpieces W in a conveying direction R, which is typically parallel to the X direction of the measurement, along a conveying path.

In this case the conveying device 2 is designed in such a way that a plate-shaped workpiece W can be conveyed on the conveying device 2 in a vertical orientation or in an orientation inclined by a few degrees with respect to the vertical, while in this context the workpiece W rests with its lower side edge on the conveying device 2 and is supported in the upper region at one of the two opposite main surfaces F, which define the main planes of the workpiece, by a lateral guide on a frame, usually with rollers or balls for reducing friction.

The conveying device 2 can be operated intermittently, but typically operates continuously during the measurement of a workpiece. A generally continuous operation is advantageous, in order to minimize the influences of acceleration and deceleration effects and to increase the throughput.

Figure 1A:
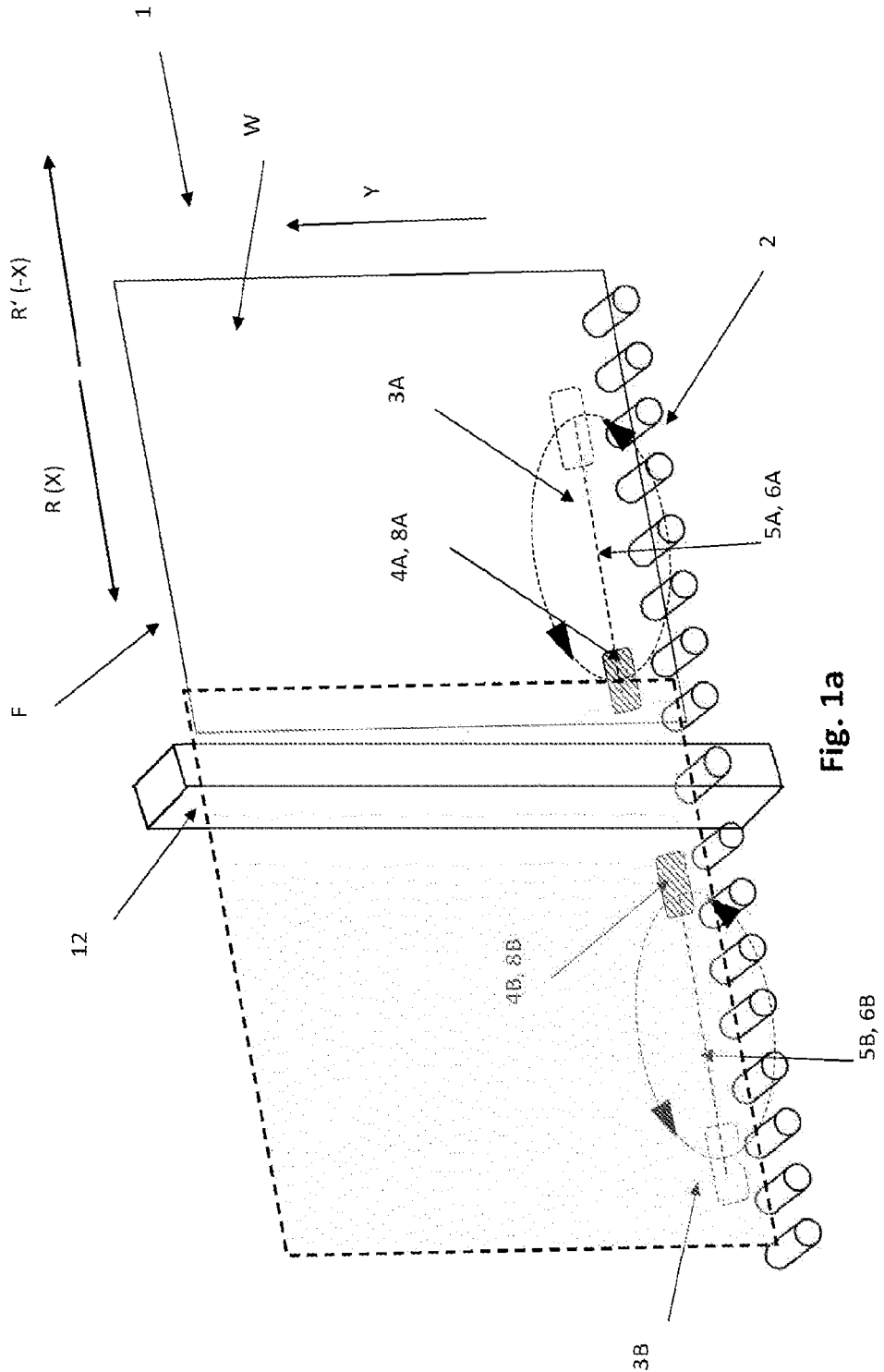
FIG. 1a shows in schematic form a perspective front view of an apparatus for measuring plate-shaped workpieces.
Figure 1B:
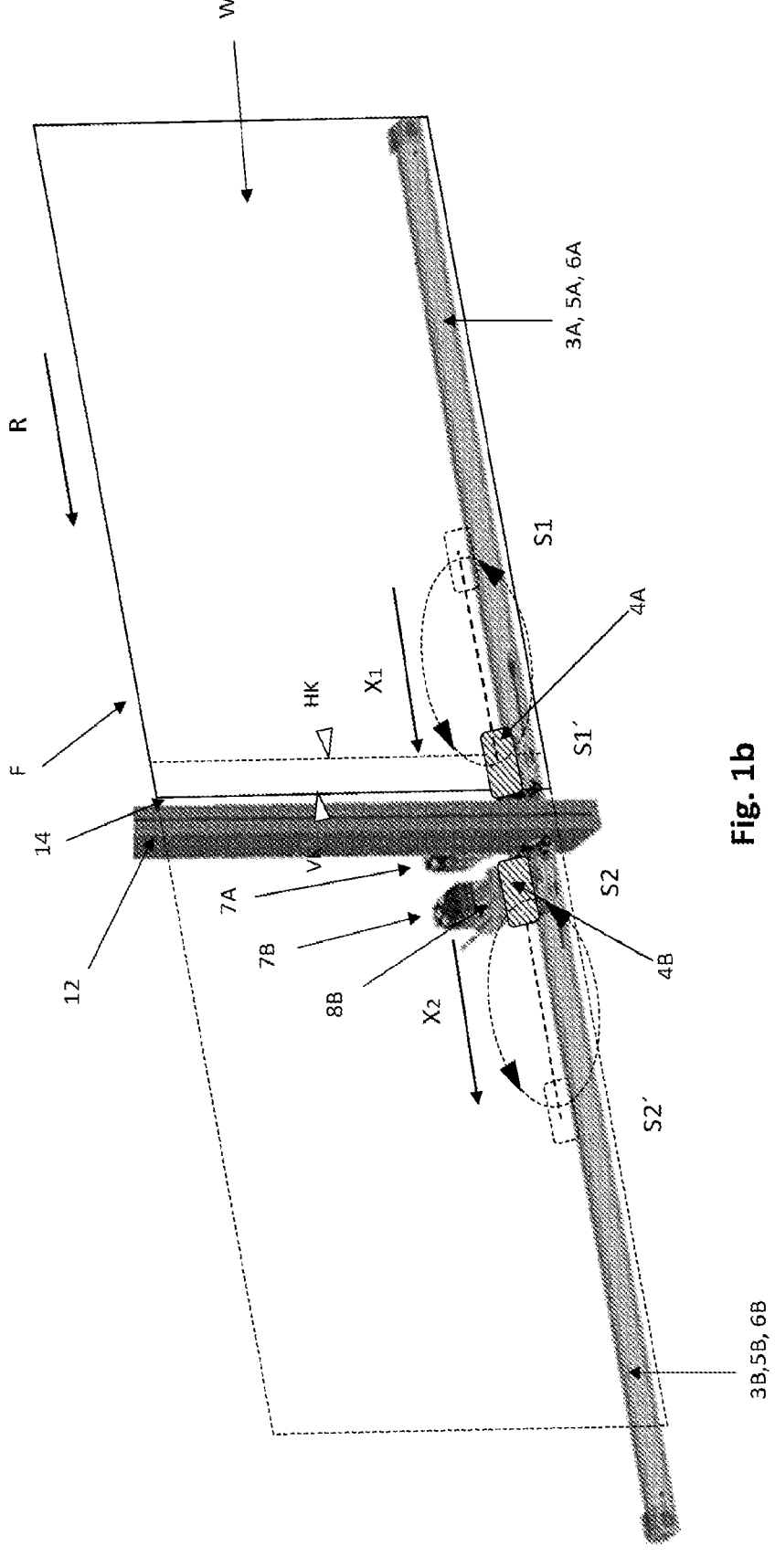
FIG. 1b shows in schematic form the front view of the apparatus from FIG. 1a, to explain the measuring and functional principle.
Figure 2:
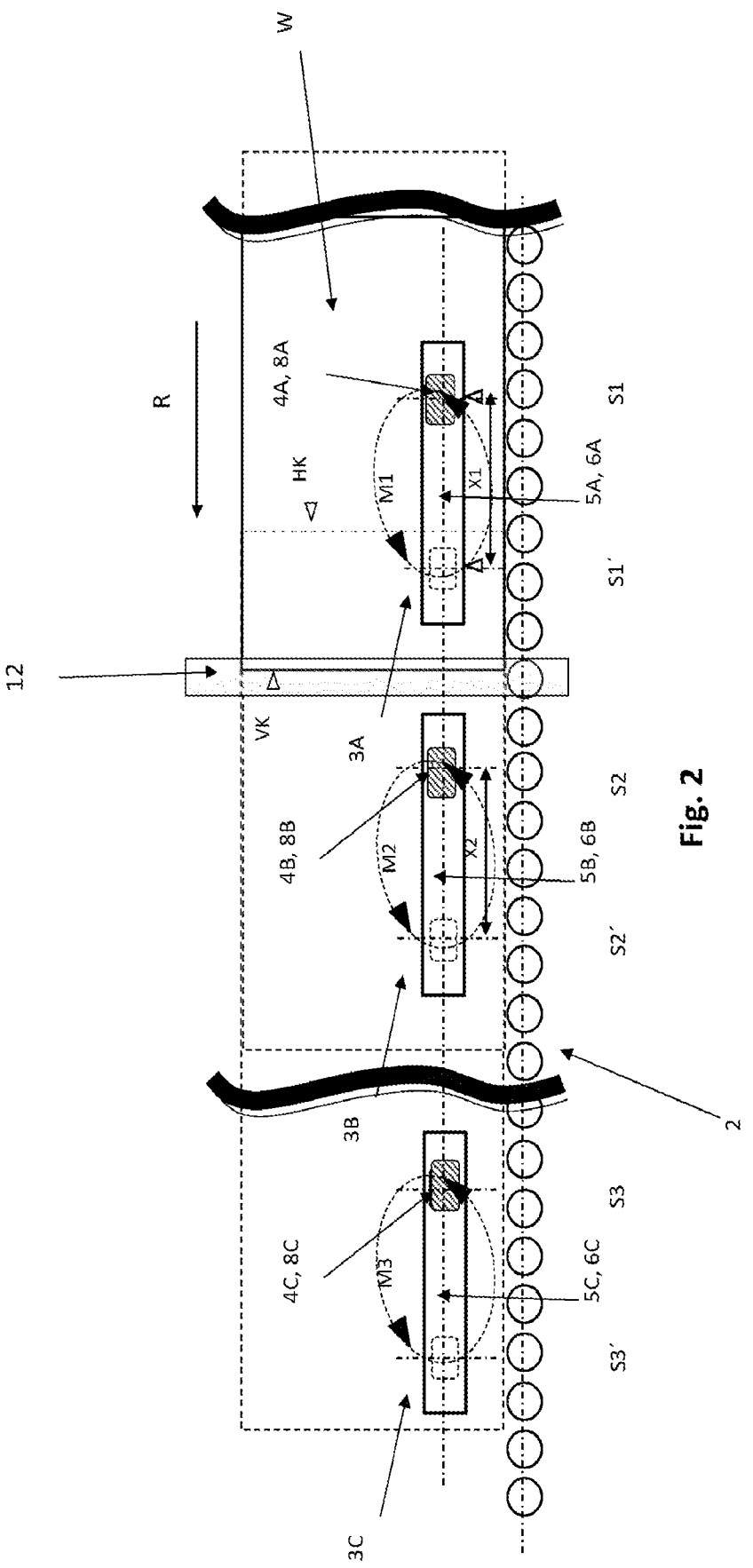
FIG. 2 shows in schematic form a front view of an apparatus for measuring plate-shaped workpieces in a modified arrangement with a third measuring device.

The measuring apparatus 1, according to the variant of FIGS. 1a and 1b, further comprises a first measuring device 3A and a second measuring device 3B; and the variant of FIG. 2 comprises a further measuring device 3C. In principle, all of said measuring devices are designed and constructed in the same manner and can be operated independently of one another. Each of the measuring devices 3A, 3B, 3C has a driver 4A, 4B, 4C that is designed in such a way that it can be selectively coupled to and decoupled from a main surface F of the plate-shaped workpiece W; that in the coupled state said driver can be moved together with said workpiece passively or forcibly in the conveying direction R (the direction of the X axis); and that in the decoupled state said driver is actively movable in a direction R' opposite to the conveying direction R; and that said driver is assigned to a measuring ruler 5A, 5B, 5C, which is arranged in a fixed/stationary manner on the measuring apparatus and which extends in the conveying direction R (the direction of the X axis), in such a way that a position and/or a movement distance of the driver 4A, 4B, 4C in the conveying direction R (the direction of the X axis) can be detected. The speed of the movement of the respective driver 4A, 4B, 4C and, thus, the actual speed of the movement of the workpiece W can also be determined from the detection of the movement on the measuring ruler.

The measuring rulers 5A, 5B of the first and the second measuring device 3A, 3B (and optionally the third or each additional measuring device 3C) are arranged in such a way that they detect different regions of the conveying path of the plate-shaped workpiece W in the conveying direction R. However, the measuring rulers do not have to overlap, if the distances or positions of the starting positions of the drivers inside the apparatus in the conveying direction are known or can be determined.

Figure 5:
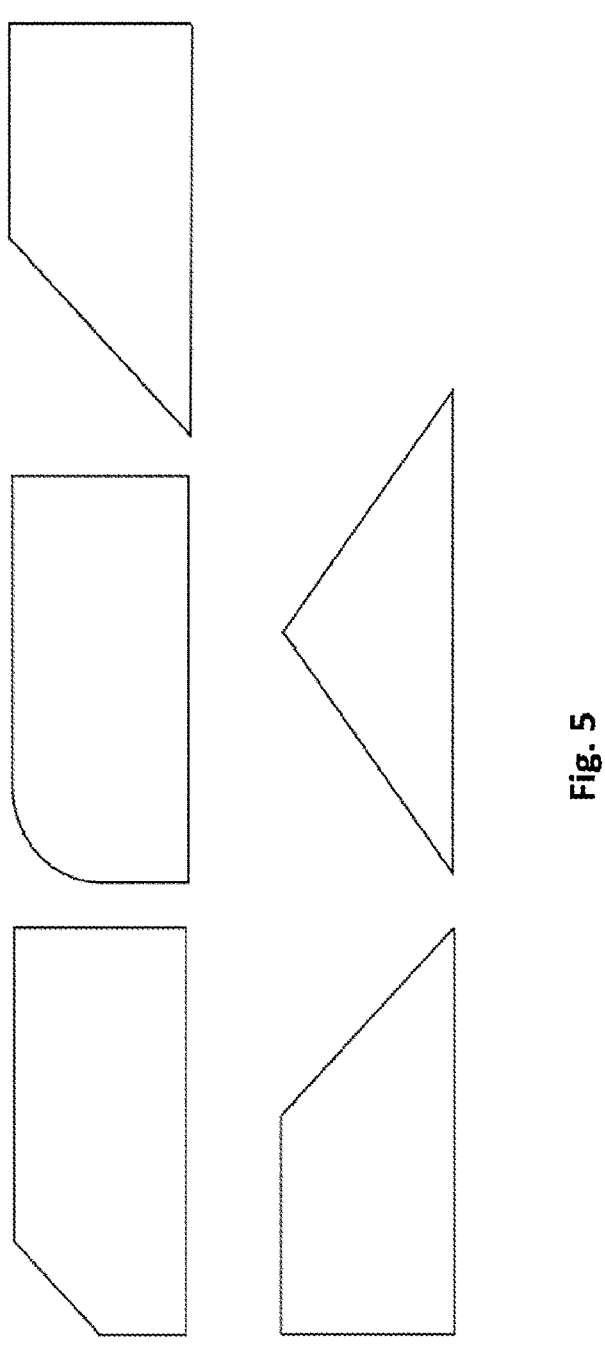
FIG. 5 shows examples of special shapes of flat glass sheets or insulating glass elements that can be measured with the measuring apparatus.

In the case of the measuring apparatus, shown in FIG. 1a, 1b, the measuring devices 3A, 3B are arranged on both sides, in the conveying direction, of an additional measuring device 12 for detecting a dimension of the plate-shaped workpiece W in a vertical direction Y perpendicular to the conveying direction R. In the embodiment shown, this additional measuring device 12 is arranged behind a frame and detects the workpiece through a gap 14 between two adjacent frames 10 of the apparatus for supporting the workpiece. However, the additional measuring device 12 can also be arranged on the front side of the frame 10. In the case of an arrangement behind the frame the front side is free for the arrangement of processing apparatuses. This additional measuring device 12 can be equipped, for example, like the measuring device described in DE 196 41 861 A1, with one or more rows of optical sensors for detecting the vertical dimension of the workpiece or, as an alternative, with one or more line scan cameras or a laser scanner or another suitable measuring device for determining the vertical dimension or the coordinates in the vertical direction of the workpiece (in the direction of the Y axis). The use of a scanner makes it possible to detect the course of the outer contour of any special shapes of workpieces. They are flat glass elements that deviate from the rectangular shape. Examples of such special shapes are shown in FIG. 5.

The additional measuring device 12 can also be combined with an optical inspection unit for optically detecting other properties of the workpiece (for example, errors), as described in EP 3 433 576 B1. Furthermore, the additional measuring device 12 can be stationary or movable in the conveying direction R.

According to the present invention, the drivers 4A, 4B, 4C of the measuring devices 3A, 3B, 3C are designed in such a way that they can be selectively coupled to and decoupled from the main surface F of the plate-shaped workpiece W. A particularly preferred embodiment of these drivers is in the form of a well-known vacuum gripper or suction gripper 11 (see FIG. 4), which can be coupled to and decoupled from the main surface F of the plate-shaped workpiece W, in that said gripper is moved with its suction plate by means of a drive (not shown), for example, a hydraulic cylinder, in the direction of the Z axis and is pressed against the surface F. Since the suction gripper is used only for the purpose of the measurement of the movement of the workpiece to be described below, but does not bring about the actual conveyance of the workpiece, it can be made relatively small and only has to exhibit a holding force or a negative pressure to the extent that in the coupled state it is not displaced relative to the main surface F due to friction in the drive, a speed difference in the drive or due to vibrations. In addition, a cover can be arranged over the suction gripper, so that it does not leave any marks on the main surface.

The drivers 4A, 4B, 4C are designed to interact in a contactlessly or mechanically coupled manner with the respectively associated stationary measuring ruler 5A, 5B, 5C, in order to determine the position and/or the movement distance of the respective driver 4A, 4B, 4C in the conveying direction R (the direction of the X axis). A contactless detection of the movement can be carried out, for example, as described in EP 3 433 576 B1, with a magnetic measuring ruler and a sensor, which is coupled to the movement of the driver and which can detect magnetic field strength changes along the measuring ruler.

In addition, each driver 4A, 4B, 4C is assigned a transport device 6A, 6B, 6C (indicated in the FIGS. 1*a*, 1*b* and 2 only by means of the dashed lines with respect to its function). Said transport device is designed to guide the movement of the respectively associated driver 4A, 4B, 4C in the conveying direction R and to actively move and return to a starting position the respective driver 4A, 4B, 4C in the direction R' opposite to the conveying direction R by means of its own drive 7A, 7B, 7C (see FIG. 3*c*). The transport device 6A, 6B, 6C can have a linear drive or a rotary drive in the form of a drag belt, a belt or a drag chain. In this case the drive 7A, 7B, 7C can be controlled preferably in such a way that it moves the respective driver 4A, 4B, 4C in the conveying direction R synchronously with the drive of the workpiece W by means of the conveying device 2, in order to avoid the forces, which act on the driver 4A, 4B, 4C, in the conveying direction R and which could have a negative effect on said driver's adhesion to the surface F of the workpiece. The synchronous drive of the drivers 4A, 4B, 4C in the conveying direction R by the drive 7A, 7B, 7C of the transport device 6A, 6B, 6C also reduces the influences of inertia.

Particularly preferred is an embodiment, in which the drive 7A, 7B, 7C of the respective transport device 6A, 6B, 6C is controlled by detecting a front edge of the fed-in workpiece, in order to accelerate the driver 4A, 4B, 4C to the speed of the workpiece before attaching said driver to the workpiece. A corresponding acceleration phase is also carried out preferably before the driver of the subsequent measuring device is attached. As an alternative, the transport device 6A, 6B, 6C can also be provided with a coupling, which uncouples the drive 7A, 7B, 7C when the respective driver 4A, 4B, 4C moves in the conveying direction R, and, as a result thereof, reduces the friction.

Figures 3A, 3B, 3C:
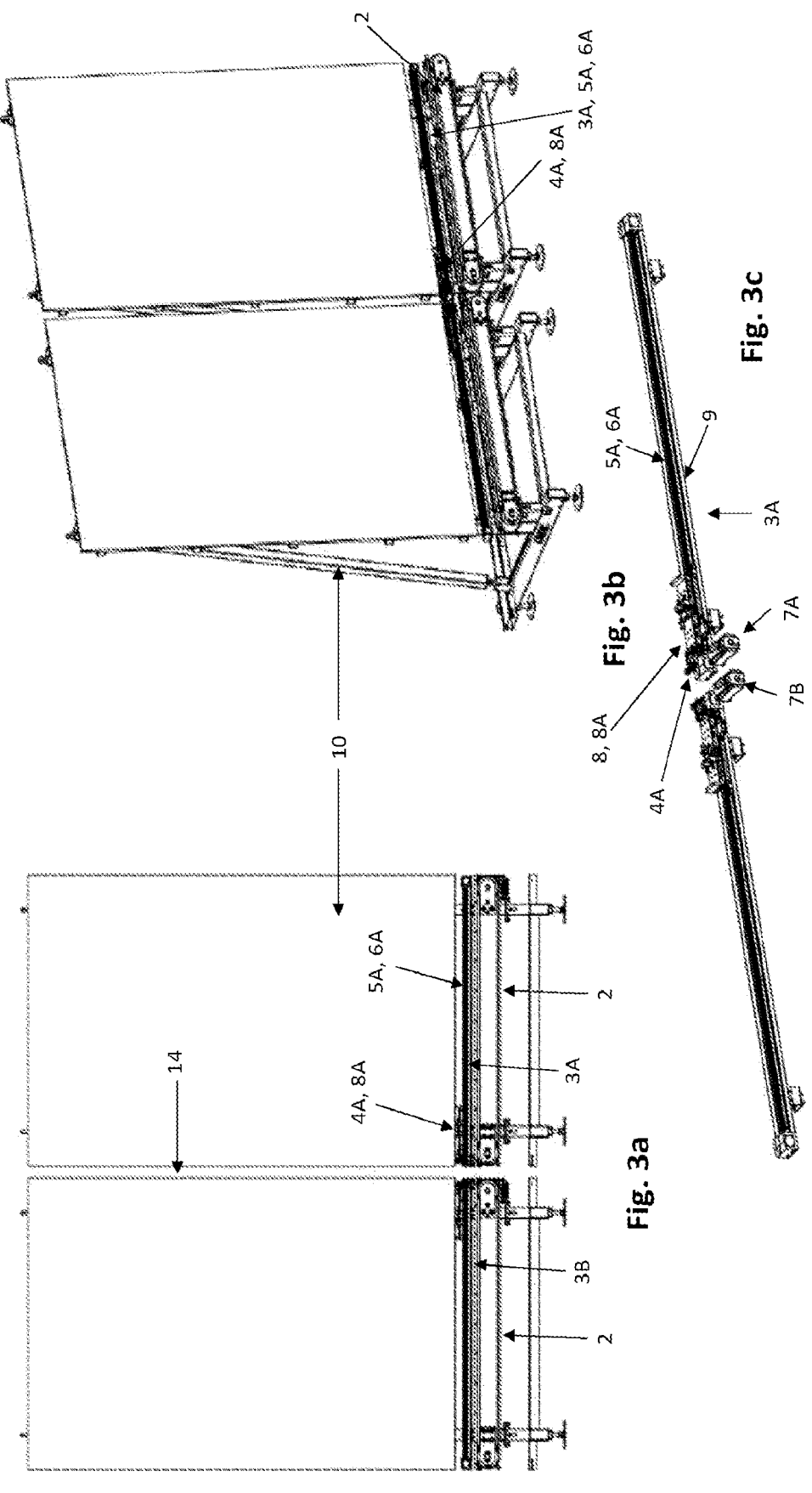
Figure 4:
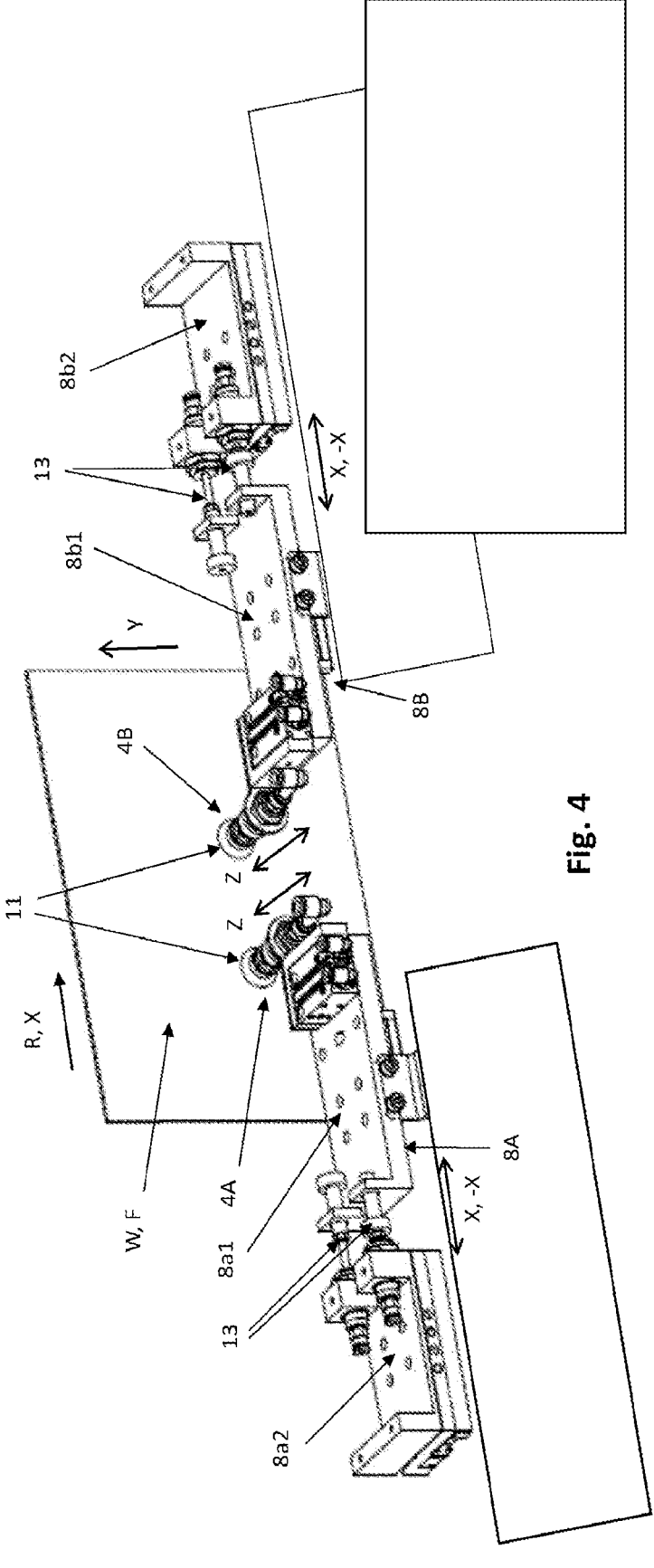
FIG. 4 shows in schematic form the detail of the carriage and the driver in the form of a suction device in a measuring device.

As shown in schematic form in FIG. 3*c*, each driver 4A, 4B, 4C can be mounted inside the respective measuring device 3A, 3B, 3C on a carriage 8 (8A, 8B, 8C), which can be moved along a guide 9 of the transport device 6A, 6B, 6C. As indicated in FIG. 4, the carriage 8 is divided preferably into two subsections 8*a*1, 8*a*2, which can move relative to one another at least in the conveying direction R. Each driver 4A, 4B, 4C is coupled to one of the sections 8*a*1, 8*a*2 (8*b*1, 8*b*2) of the respective carriage 8, 8A (8B), which is also coupled to the measuring ruler 5A, 5B, 5C; and the other section 8*a*1, 8*a*2 of the carriage 8 is coupled in turn to the transport device 6A, 6B, 6C of the respective carriage 8. The two subsections 8*a*1, 8*a*2 of the carriage 8 are coupled to one another by means of a cylinder 13 or a pair of contra-rotating cylinders 13, as shown. Said cylinder(s) can be switched between a first state, in which said cylinder(s) rigidly connects/connect the two sections 8*a*1, 8*a*2 to one another, and a second state, in which a free or damped relative movement between the two sections 8*a*1, 8*a*2 is possible (for example, during the measurement phase and/or an acceleration phase starting from the starting position). By determining a difference between the speed of the drivers 4A, 4B, 4C, determined on the measuring ruler 5A, 5B, 5C, and a speed of the conveying device 2, the drive 7A, 7B, 7C of the respective transport device 6A, 6B, 6C can be controlled or regulated in such a way that this difference is compensated, and the drives run synchronously, in order to avoid forces, acting on the drivers 4A, 4B, 4C, in the conveying direction R.

The carriage 8 interacts with the associated measuring ruler 5A, 5B, 5C, for example, by means of a sensor, which has already been described, in order to determine the movement distance and/or position along the measuring ruler. The measuring ruler and the transport device can be combined into one unit to form the measuring device, as indicated in FIG. 3*c*. In the embodiment of FIG. 3*a*, 3*b*, the measuring devices, shown in isolation in FIG. 3*c*, are located as elements in a region between the frame 10, acting as a supporting wall for laterally supporting the workpieces, and the conveying apparatus 2 for supporting the plate-shaped workpieces on the underside thereof.

A measuring process using the innovative measuring apparatus from FIG. 1*a* is described below with reference to FIG. 1*b*.

First, a workpiece W to be measured is conveyed on the conveying device 2 in the conveying direction R. After the detection of the front edge VK of the workpiece W in the conveying direction, the drive 7A of the first transport device 6A of the first measuring device 3A is actuated, in order to accelerate the driver (suction device) 4A to the speed of the workpiece W before said driver is attached to the workpiece. Then the first driver (suction device) 4A of the first measuring device 3A in the starting position S1 adheres to the main surface of the workpiece W. From this point in time the measurement of the transport path of the workpiece in the X direction begins by means of the first measuring ruler 5A of the first measuring device 3A. In this case the position S1 is spaced at a certain defined distance back from the front edge VK opposite to the conveying direction R.

A simple optical sensor or a light barrier is sufficient to detect the front edge VK for the purpose of accelerating the first transport device 6A of the first measuring device 3A. In order to detect the front edge VK for the purpose of measuring the contour, a simple optical sensor or a light barrier is also sufficient for rectangular workpieces. In the case of deviating shapes the front edge can also be detected by a scanner 12, which has already been described, over the entire height (Y direction) (the scanner 12 is used here to describe the principle).

With the detection of the front edge VK or a characteristic measurement point on the workpiece by the scanner 12, the distance measurement of the movement of the (first) driver 4A (suction device) of the first measuring device 3A along the first measuring ruler 5A/M1 is continued. Since the distance X0 between the sensor/scanner 12 is known when the front edge VK and the starting position S1 of the first driver 4A on the first measuring ruler 5A are detected, the conveying distance of the workpiece along the first measuring ruler in the direction of the X-axis can be precisely determined with the start of the detection of the movement of the first driver 4A, which is coupled to the workpiece.

During conveyance, the workpiece and with said workpiece the first driver 4A are moved from the position S1 by the distance X1 in the direction of the X axis; and, thus, the front section of the workpiece is advanced beyond the scanner 12.

Before the first driver 4A has reached the end position S1' or when the front edge VK or a characteristic measurement point on the workpiece is detected by the scanner 12, the drive 7B of the second transport device 6B of the second measuring device 3B is actuated, in order to accelerate the driver (suction device) 4B to the speed of the workpiece W before said driver is attached to the workpiece. Shortly before the first driver 4A has reached the end position S1', the second driver 4B of the second measuring device 3B is also coupled in its starting position S2 to the main surface F of the workpiece W. Thus, both drivers 4A, 4B adhere to the workpiece W for a short period of time. Here, too, the distance of the starting position S2 of the second driver 4B from the scanner 12 or the end position S1' of the first driver 4A is known or can be determined from the subsequent measurement along the measuring ruler 5B.

Then the first driver 4A is uncoupled from the main surface F of the workpiece. While the second driver 4B remains coupled to the workpiece W during the preferably continuous further transport of the workpiece W by means of the conveying apparatus 2 in the conveying direction R and is moved together with said workpiece by the distance X2 along the second measuring ruler 5B in the direction of the X axis, the first driver 4A is actively moved back into its starting position S1 by the transport device 6A of the first measuring device 3A in the direction R' opposite to the conveying direction R. The control of the drive speed of the drive 7B of the second transport device 6B of the second measuring device 3B synchronously with that of the conveying apparatus 2 takes place in the described manner by a comparison of the two speeds and a compensation of any difference that may be detected.

Before the second driver 4B reaches its end position S2', the first driver 4A is coupled in turn in its starting position S1 to the main surface F of the workpiece, as has already been described above. Thus, the two drivers 4A, 4B adhere again to the workpiece W for a short period of time.

After the uncoupling of the second driver 4B from the main surface F of the workpiece, the process is repeated in that, on the one hand, the second driver 4B is actively moved back into its starting position S2 in the direction R' opposite to the conveying direction R by the transport device 6B of the second measuring device 3B; and the first driver 4A is taken along by means of its coupling to the workpiece during the conveyance of said workpiece in the conveying direction R; and the movement distance thereof on the first measuring ruler 5A in the direction of the X axis is detected.

This process is repeated, if necessary, several times until the rear edge HK of the glass sheet is detected by the scanner 12.

The total length of the workpiece in the X direction (parallel to the conveying direction R) can be precisely determined in a continuous process from the detection of the front edge and the rear edge of the workpiece and the addition of the known distances between the starting positions S1, S2 of the drivers 4A, 4B and the scanner 12 and the movement distances X1, X2 etc., measured on the measuring rulers 5A, 5B of the measuring devices, in the direction of the X axis of the drivers 4A, 4B. In the case of rectangular workpieces the detection of the height of the workpiece in the Y direction by means of the scanner 12 is sufficient, so that in conjunction with the length in the X direction, the size of the workpiece and optionally the position of characteristic measurement points on said workpiece can be determined. In the case of non-uniform workpieces the size and shape can likewise be detected precisely with the assistance of the scanner by combining the length in the X direction with the detection of the contour of the front and rear edge, and, if necessary, the change in the height in the Y direction.

In order to control this measurement process, the measuring apparatus comprises a control unit that is designed to control the coupling and decoupling of the drivers 4A, 4B of the first and the second measuring device 3A, 3B in such a way that during the movement of the plate-shaped workpiece W at least one of the drivers 4A, 4B is always coupled to said workpiece. In addition, said control unit is designed to determine a cumulative movement distance of the workpiece W in the conveying direction R (in the direction of the X axis), on the basis of the detected positions and/or movement distances of the drivers 4A, 4B of the first and second measuring device 3A, 3B and predefined or determined starting positions.

In order to detect the entire outer contour of the workpiece, the control unit is further designed to assign the detection result of the additional measuring device 12 (coordinates of measurement points in the Y direction) to the cumulative movement distance of the workpiece W, i.e., the coordinates in the direction of the X axis, said movement distances having been detected by means of the drivers 4A, 4B of the first and second measuring device 3A, 3B, in order to determine the entire contour of the workpiece.

The coordinates of the workpiece that are assigned in this way can be converted to a different reference point within a production line, the distance of said workpiece from the reference point or origin of the measuring apparatus being known, so that not only the position of the workpiece within the production line can be determined at any time, but also that further processing operations can be precisely controlled at other processing stations with respect to those assigned coordinates of the workpiece determined by the measuring apparatus.

FIGS. 3a and 3b show a front view of an embodiment that is somewhat more specific in terms of system engineering of the apparatus for measuring plate-shaped workpieces. In this apparatus there is a frame 10, on which during transport the plate-shaped workpieces are supported in a position slightly inclined with respect to the vertical. The individual components of the measuring apparatus that were described above are also arranged on the frame, wherein the use of the same reference numerals refers to the similar function; and a repeated detailed description of the components is omitted. FIG. 3c shows, in isolation, the detail of the measuring devices 3A, 3B of the apparatus from FIGS. 3a and 3b, seen from behind.

As indicated by the illustration in FIGS. 1a and 2, the conveying apparatus 2 for the workpieces can be a well-known roller conveyor with one or more driven rollers. However, it can also be, as indicated in FIG. 3a, 3b, a belt conveyor, which is also well-known, or a combination of different conveyors. The conveying apparatus has preferably its own conveying drive, in order to actively convey the plate-shaped workpiece W in the conveying direction R. A combination of a not self-driven conveying device for supporting the workpiece on the underside with a drive device in the form of well-known conveyor suction devices, which act, like the measuring device, on one of the main surfaces and convey the workpiece, is also conceivable.

The measuring apparatus of the present invention has been described with reference to the embodiment from FIG. 1a, 1b with two measuring devices, the drivers of which are alternately coupled to the main surface of the workpiece. During the movement of said workpiece said measuring devices are taken along together with said workpiece in the conveying direction; and the measuring rulers of said measuring devices detect the movement of the driver. However, as indicated in FIG. 2, the apparatus can have a third measuring device 3C and optionally other measuring devices of the same type in the conveying direction, where said additional measuring devices can be coupled alternately to the workpiece in the same way. In this embodiment, for example, not only the length of the workpiece can be measured once, but also the contour or geometry of the workpiece is prepared for subsequent processing stations; and/or the position of the workpiece within a longer production line is continuously detected and used to control various processing operations at respective processing stations.

The invention claimed is:

1. An apparatus for measuring a plate-shaped workpiece, comprising:
   a conveying device for conveying the plate-shaped workpiece in a conveying direction along a conveying path;
   first and second measuring devices including respective first and second drivers and respective first and second measuring rulers, each of the first and second drivers being selectively couplable to and decouplable from the plate-shaped workpiece, wherein, in a coupled state, each of the first and second drivers is moveable together with the plate-shaped workpiece in the conveying direction, and, in a decoupled state, is actively movable in a direction opposite to the conveying direction and is assigned to its respective one of the first and second measuring rulers, which extends in the conveying direction such that a position and/or a movement distance of each of the first and second drivers in the conveying direction is detectable,
   wherein the first and second measuring rulers are arranged to detect different regions of the conveying path of the plate-shaped workpiece in the conveying direction, and
   wherein the first and second drivers are couplable to decouplable from a main surface of the plate-shaped workpiece.

2. The apparatus of claim 1, wherein the first and second drivers are designed to interact in a contactless or mechanical manner with the first and second measuring rulers, respectively, to detect the position and/or the movement distance of the first and second drivers in the conveying direction.

3. The apparatus of claim 1, wherein the first and second drivers are respectively assigned to first and second transport devices designed respectively to guide movement of the first and second drivers in the conveying direction and to actively move the first and second drivers in the direction opposite to the conveying direction via respective first and second drives.

4. The apparatus of claim 3, wherein the first and second drivers are respectively mounted on first and second carriages that are movable along a guide.

5. The apparatus of claim 4, wherein each of the first and second carriages is divided into two sections that can move relative to one another in the conveying direction, and wherein the first and second drivers are attached to one of the two sections of the respective first and second carriages, said one of the two sections of each of the first and second carriages also being coupled to the respective one of the first and second measuring rulers, and a second of the two sections of each of the first and second carriages being coupled to the respective one of the first and second drives.

6. The apparatus of claim 5, wherein the two sections of each of the first and second carriages are coupled to each other via a cylinder that is switchable between a first state in which the cylinder rigidly connects the two sections to one another, and a second state in which a damped relative movement between the two sections is made possible.

7. The apparatus of claim 3, wherein each of the first and second transport devices comprises a linear drive or a rotary drive.

8. The apparatus of claim 1, wherein the first and second drivers each have a suction gripper couplable to and decouplable from the main surface of the plate-shaped workpiece.

9. The apparatus of claim 1, wherein the conveying device is configured to enable the plate-shaped workpiece to be conveyed in a vertical orientation or in an orientation inclined with respect to vertical.

10. The apparatus of claim 1, wherein the conveying device comprises a roller conveyor or a belt conveyor or a combination thereof.

11. The apparatus of claim 1, wherein the conveying device comprises a conveying drive for actively conveying the plate-shaped workpiece in the conveying direction.

12. The apparatus of claim 10, further comprising: a further measuring device to detect a dimension of the plate-shaped workpiece in a direction perpendicular to the conveying direction.

13. The apparatus of claim 12, further comprising: a control unit to control coupling and decoupling of the first and second drivers such that, during movement of the plate-shaped workpiece, at least one of the first and second drivers is always coupled to the plate-shaped workpiece, and to determine a cumulative movement distance of the plate-shaped workpiece in the conveying direction based on the detected positions and/or movement distances of the first and second drivers.

14. The apparatus of claim 13, wherein the control unit is designed to assign a detection result of the further measuring device to the cumulative movement distance of the plate-shaped workpiece determined by the first and second drivers to determine a contour and/or arbitrary regions of the plate-shaped workpiece.

15. The apparatus of claim 1, wherein the plate-shaped workpiece is a flat glass sheet or an insulating glass element.

16. The apparatus of claim 1, wherein the first and second measuring rulers are fixed/stationary measuring rulers.

17. The apparatus of claim 7, wherein the linear drive or the rotary drive comprises a drag belt or a drag chain.

* * * * *